United States Patent

Cohen

[15] 3,642,295
[45] Feb. 15, 1972

[54] SELF-ADJUSTING SEAL RING

[72] Inventor: Albert Cohen, Wallingford, Pa.

[73] Assignee: Westinghouse Electric Corporation, Pittsburgh, Pa.

[22] Filed: Jan. 15, 1970

[21] Appl. No.: 3,181

[52] U.S. Cl. .......................................................... 277/226
[51] Int. Cl. ........................................................... F16j 15/00
[58] Field of Search .................................................. 277/226

[56] References Cited

UNITED STATES PATENTS 1,809,407   6/1931   Fox.........................................277/226

FOREIGN PATENTS OR APPLICATIONS 927,629   5/1963   Great Britain...........................277/226

*Primary Examiner*—Robert I. Smith
*Assistant Examiner*—Robert I. Smith
*Attorney*—A. T. Stratton, F. P. Lyle and F. Cristiano, Jr.

[57] ABSTRACT

Two half-ring segments of tubing of the Bourdon type are utilized to provide a self-adjusting seal ring between two stationary surfaces, as in the first stage nozzle of a turbine. The stationary parts may be so assembled that there is compressive force on the ring segments to form a seal between the stationary surfaces. The pressure drop across the rings also forms a sealing surface.

In an alternate arrangement both ends of each ring segment are welded closed with a predetermined amount of vaporizable fluid, such as water, in the tube to form a pressure vessel. When steam is supplied to the turbine, the entrapped water is heated to generate pressure which increases the height of the Bourdon tube to form the seal.

10 Claims, 3 Drawing Figures

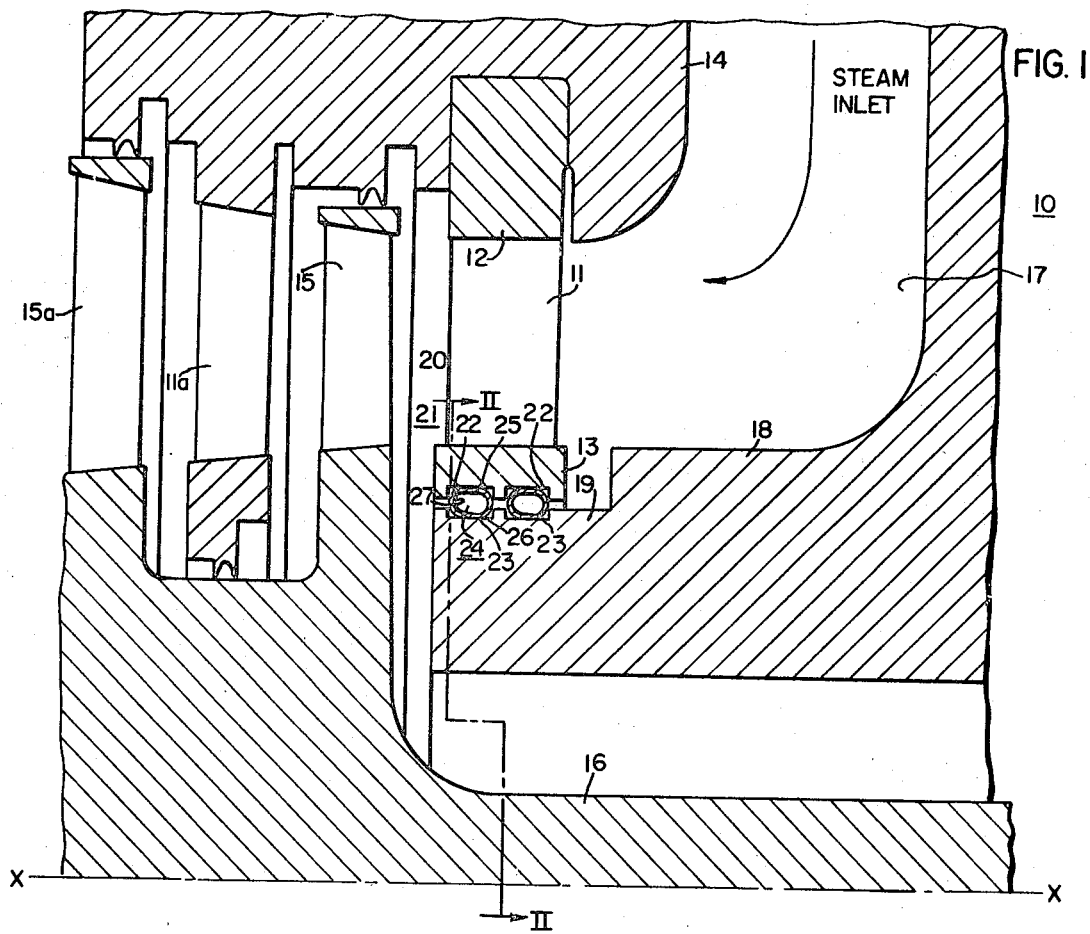
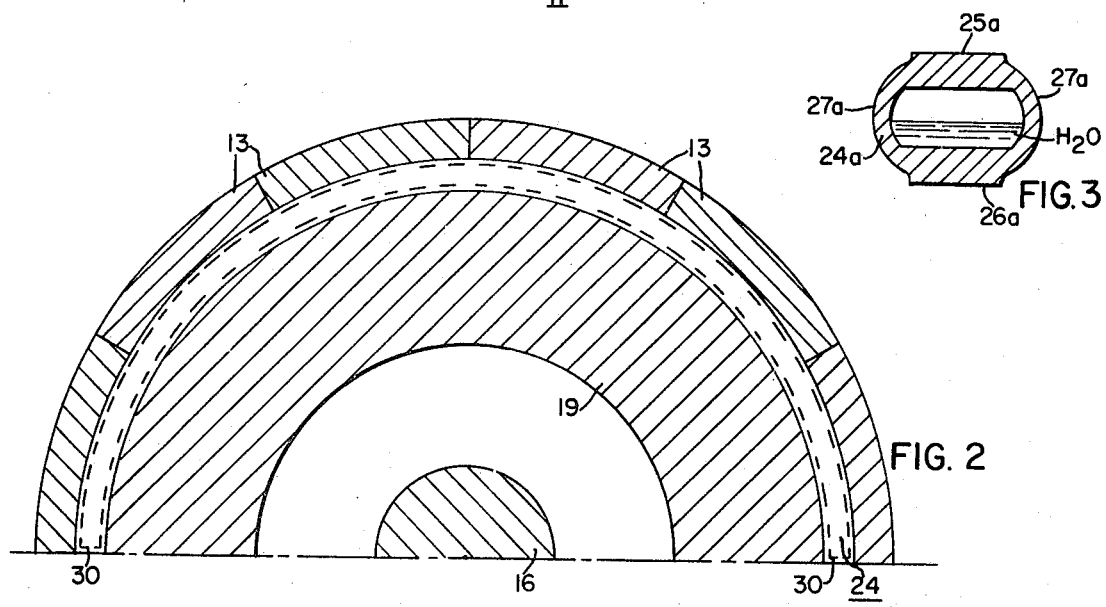

SELF-ADJUSTING SEAL RING

BACKGROUND OF THE INVENTION

This invention relates, generally to seal arrangements and, more particularly to self-adjusting annular seals for axial flow turbines.

In a prior annular seal arrangement for an axial flow turbine, a plurality of arcuate segments are used to form a seal ring. Each segment is spring biased to maintain a sealing force on the ring. The segments are mounted end to end in a generally channel-shaped annular seal housing. The prior seal arrangement is generally satisfactory in operation, but is expensive to manufacture.

SUMMARY OF THE INVENTION

In accordance with one embodiment of the invention, two half-ring segments of tubing of elliptical cross section of the Bourdon type are utilized to provide a self-adjusting annular seal between high- and low-pressure regions defined by relatively stationary members. The tubing is retained in oppositely disposed channels in two of the stationary members which are so assembled that there is compressive force on the opposed flattened surfaces of the tubing to form a seal between the stationary members. The pressure drop across the seal ring also forms a sealing surface in a manner similar to prior static seals.

In an alternate arrangement suitable for use in a hot fluid utilizing machine, such as a turbine, internal pressure is applied to the tube to form the seal, thereby making the initial pressure unnecessary. One method of pressurizing the tube is to weld both ends of each half-ring segment closed with a predetermined amount of a vaporizable liquid, such as water, in the tube to form a pressure vessel. When high-temperature motive fluid is supplied to the machine, the entrapped fluid is heated to generate pressure within the tube, thereby increasing the height of the tube to form a seal between the members.

BRIEF DESCRIPTION OF THE DRAWING

For a better understanding of the nature of the invention, reference may be had to the following detailed description, taken in conjunction with the accompanying drawing, in which:

FIG. 1 is a fragmentary axial sectional view of a portion of an axial flow turbine with an annular seal arrangement constructed in accordance with principles of the present invention;

FIG. 2 is a view, in section, taken along the line II—II in FIG. 1, and

FIG. 3 is an enlarged view, in cross section, of a modified form of seal ring embodying features of the invention.

DESCRIPTION OF PREFERRED EMBODIMENTS

Referring to the drawing, particularly to FIG. 1, there is shown therein a portion of the steam inlet structure of an axial flow turbine 10 which includes an annular array of circumferentially spaced stationary blades or vanes 11 secured between arcuate outer shroud segments 12 and arcuate inner shroud segments 13. The outer shroud segments 12 are mounted in a stator blade ring 14 disposed inside a turbine casing (not shown) which is generally circular in cross section.

An annular array of rotor blades 15 is disposed immediately downstream from the stationary blades 11. The rotor blades 15 are suitably attached to the periphery of a rotor 16 which rotates in the turbine casing about an axis X—X. The stationary blades 11 and the rotor blades 15 constitute the first stage of the turbine which may include other stationary blades 11a and rotor blades 15a disposed downstream from the blades 15, thereby increasing the number of stages in the turbine.

A high-temperature compressed motive fluid is supplied to the turbine from a suitable source (not shown). The hot motive fluid flows to the blades 11 through an annular inlet passageway 17 defined by an annular stationary guide member 18 and the blade ring 14. The guide member 18 has an annular portion 19 spaced from and encircled by the inner shroud segments 13 which are disposed in end-to-end relation to form an annular structure as shown in FIG. 2. The rotor 16 is driven by the energy extracted from the hot motive fluid in a manner well known in the art.

In order to minimize leakage of the elastic fluid around the blades 11 from the high pressure region 17 to a lower pressure region 20, a self-adjusting seal arrangement 21 is provided to cooperate with the inner shroud segments 13 and the annular portion 19 of the guide member 18. As shown in FIG. 1, the opposing surfaces of the arcuate segments 13 and the annular portion 19 of the guide member 18 have oppositely disposed annular channels 22 and 23, respectively, therein.

An arcuate shaped tube 24 of the Bourdon type having a generally elliptical or flattened oval cross section is compressed in the channels to form a seal between the relatively stationary members 13 and 19. The tube 24 is composed of metal or other suitable resilient material. The relatively stationary members are so assembled that there is radial compression on the tube 24, which has its major diameter disposed in axial direction, causing its oppositely disposed flattened surfaces 25 and 26 to engage the bottoms of the channels 22 and 23, respectively, to form the seal. The resiliency of the side walls 27 of the tube make it a self-adjusting seal to permit relative radial movement between the members 13 and 19 caused by expansion and contraction due to temperature changes.

For reasons of assembly, the tube 24 is preferably divided into two half-ring segments, one of which is shown in FIG. 2. The other half-ring segment is similar to the one shown. As shown in FIG. 1, two parallel tubes 24 may be provided in parallel channels to improve the efficiency of the seal arrangement. Both tubes may be divided into half-ring segments with each tube providing 360° of sealing.

In an alternate arrangement suitable for utilization in an elastic fluid machine, such as a steam turbine, internal pressure is applied to the tube 24 to form the seal, thereby making it unnecessary to apply external pressure during assembly of the seal arrangement. One method of pressurizing the tube is to close both ends 30 of each half-ring segment, as by welding, with a predetermined amount of a vaporizable fluid, such as water, in the tube to form a pressure vessel as shown in FIG. 3. When a high-temperature motive fluid, such as steam, is supplied to the machine through the passageway 17, the entrapped fluid in the tube is heated and partially vaporized to generate a fluid pressure within the tube, thereby increasing the radial height of the tube to form a seal between the members 13 and 19.

As shown in FIG. 3, an extruded tube 24a may be provided instead of a Bourdon tube of the usual type. The tube 24a has oppositely disposed surfaces 25a and 26a which are substantially flat transversely of the tube. Also, the walls of the tube having the flat surfaces are thicker than the sidewalls 27a. The flat sealing surfaces 25a and 26a provide a more effective seal.

From the foregoing description it is apparent that the invention provides a self-adjusting seal arrangement particularly suitable for utilization in a hot fluid utilizing machine to minimize leakage of the motive fluid past the first row of stationary blades or vanes in the machine. The seal arrangement may be economically manufactured and installed and it is efficient in operation.

I claim as my invention:

1. A self-adjusting seal arrangement for controlling leakage of a fluid between high- and low-pressure regions, comprising
   a first annular member defining a boundary of the high-pressure region,
   a second annular member encircling and spaced from the first annular member,
   opposing surfaces of said annular members having oppositely disposed annular channels therein, and
   an arcuate-shaped tube having a generally oval cross section with the major axis of the oval being disposed axially with respect to said annular members, said tube being disposed to be compressed radially by said annular channels to form a seal between said annular members.

2. The self-adjusting seal arrangement defined in claim 1, wherein
the tube is divided into two half-ring segments.

3. The self-adjusting seal arrangement defined in claim 2, wherein
the fluid is a high-temperature pressurized fluid,
each end of each half-ring segment of the tube is sealed, and
said sealed segments are partially filled with a predetermined amount of vaporizable liquid.

4. The self-adjusting seal arrangement defined in claim 1, wherein
the tube has oppositely disposed exterior surfaces engaging the bottoms of said channels.

5. The self-adjusting seal arrangement defined in claim 4, wherein
the oppositely disposed surfaces on the tube are substantially flat transversely of the tube.

6. The self-adjusting seal arrangement defined in claim 5, wherein
the walls of the tube having flat surfaces are thicker than the sidewalls of the tube.

7. The self-adjusting seal arrangement defined in claim 1, wherein
the tube is composed of resilient material to permit relative radial movement between the channeled members.

8. The self-adjusting seal arrangement defined in claim 7, wherein
the encircling member comprises a plurality of arcuate segments.

9. The self-adjusting seal arrangement defined in claim 1, wherein
the fluid is a high-temperature pressurized fluid, and
the tube is sealed and partially filled with a predetermined amount of a vaporizable liquid.

10. The self-adjusting seal arrangement defined in claim 1, wherein
each of the opposing surfaces of said annular members has two parallel annular channels therein, and
an arcuate tube having an oval cross section is disposed between oppositely disposed annular channels.

* * * * *